US011354361B2

(12) United States Patent
Bastide et al.

(10) Patent No.: US 11,354,361 B2
(45) Date of Patent: Jun. 7, 2022

(54) DOCUMENT DISCREPANCY DETERMINATION AND MITIGATION

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 258 days.

(21) Appl. No.: 16/509,260

(22) Filed: Jul. 11, 2019

(65) Prior Publication Data

US 2021/0011954 A1 Jan. 14, 2021

(51) Int. Cl.
*G06F 16/93* (2019.01)
*G06N 20/00* (2019.01)

(52) U.S. Cl.
CPC ............ *G06F 16/93* (2019.01); *G06N 20/00* (2019.01)

(58) Field of Classification Search
CPC ...................................................... G06F 16/93
See application file for complete search history.

(56) References Cited

U.S. PATENT DOCUMENTS

| | | | |
|---|---|---|---|
| 6,219,818 B1* | 4/2001 | Freivald | G06F 16/957 714/799 |
| 6,560,620 B1* | 5/2003 | Ching | G06F 40/194 715/229 |
| 7,136,511 B2 | 11/2006 | Harrington et al. | |
| 8,364,729 B2 | 1/2013 | Balinsky et al. | |
| 8,429,194 B2 | 4/2013 | Aymeloglu et al. | |
| 9,276,758 B2 | 3/2016 | McQuarrie | |
| 10,191,965 B2 | 1/2019 | Calkowski et al. | |
| 2003/0135607 A1 | 7/2003 | Bernard et al. | |
| 2003/0167254 A1* | 9/2003 | Su | G06F 40/151 |
| 2005/0060643 A1 | 3/2005 | Glass et al. | |
| 2005/0071743 A1 | 3/2005 | Harrington et al. | |
| 2006/0155699 A1 | 7/2006 | Purvis et al. | |
| 2012/0123767 A1 | 5/2012 | Ananthanarayanan et al. | |
| 2013/0246903 A1 | 9/2013 | Mukai | |
| 2015/0220833 A1* | 8/2015 | Le | G06F 16/583 706/16 |
| 2019/0179957 A1* | 6/2019 | Andrews | G06F 16/93 |

* cited by examiner

*Primary Examiner* — Hau H Hoang
(74) *Attorney, Agent, or Firm* — Cuenot, Forsythe & Kim, LLC

(57) ABSTRACT

Document discrepancy determination and mitigation can include marking a fragment of a first document and a corresponding fragment of a second document in response to determining a dependency between the first document and the second document. A discrepancy probability with respect to the first document and the second document can be identified based on a discrepancy measure, which can be determined by comparing the marking of the fragment of the first document and the marking of the corresponding fragment of the second document. One or more discrepancy mitigation procedures can be initiated in response to the discrepancy measure exceeding a predetermined threshold.

9 Claims, 7 Drawing Sheets

DOCUMENT DISCREPANCY DETERMINATION AND MITIGATION

BACKGROUND

This disclosure relates to data processing systems, and more particularly, to electronic systems for processing electronically generated and stored documents.

A collection of processes designed to coordinate a large array of functions performed within an organization for accomplishing the organization's objectives is typically termed a quality management system (QMS). ISO 13485 standards and US FDA 21 CFR 820 regulations for medical device manufacturers typify the many QMSs used by numerous manufacturers, service providers, and governmental agencies. Many of the processes of a QMS can be automated using various software platforms developed to manage different functions performed by an organization. Such software platforms, for example, can assist a large business or governmental agency in managing large volumes of content and complying with various QMS standards and regulatory requirements.

SUMMARY

In one or more embodiments, a method can include marking, using computer hardware, a fragment of a first document and a corresponding fragment of a second document in response to determining a dependency between the first document and the second document. The method also can include identifying, using the computer hardware, a discrepancy probability with respect to the first document and the second document based on a discrepancy measure, which can be determined by comparing the marking of the fragment of the first document and the marking of the corresponding fragment of the second document. Additionally, the method can include initiating, using the computer hardware, at least one discrepancy mitigation procedure in response to the discrepancy measure exceeding a predetermined threshold.

In one or more embodiments, a system includes a processor configured to initiate operations. The operations can include marking a fragment of a first document and a corresponding fragment of a second document in response to determining a dependency between the first document and the second document. The operations also can include identifying a discrepancy probability with respect to the first document and the second document based on a discrepancy measure, which can be determined by comparing the marking of the fragment of the first document and the marking of the corresponding fragment of the second document. Additionally, the operations can include initiating at least one discrepancy mitigation procedure in response to the discrepancy measure exceeding a predetermined threshold.

In one or more embodiments, a computer program product includes a computer readable storage medium having program instructions stored thereon. The program instructions are executable by a processor to initiate operations. The operations can include marking, by the processor, a fragment of a first document and a corresponding fragment of a second document in response to determining a dependency between the first document and the second document. The operations also can include identifying, by the processor, a discrepancy probability with respect to the first document and the second document based on a discrepancy measure, which can be determined by comparing the marking of the fragment of the first document and the marking of the corresponding fragment of the second document. Additionally, the operations can include initiating, by the processor, at least one discrepancy mitigation procedure in response to the discrepancy measure exceeding a predetermined threshold.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
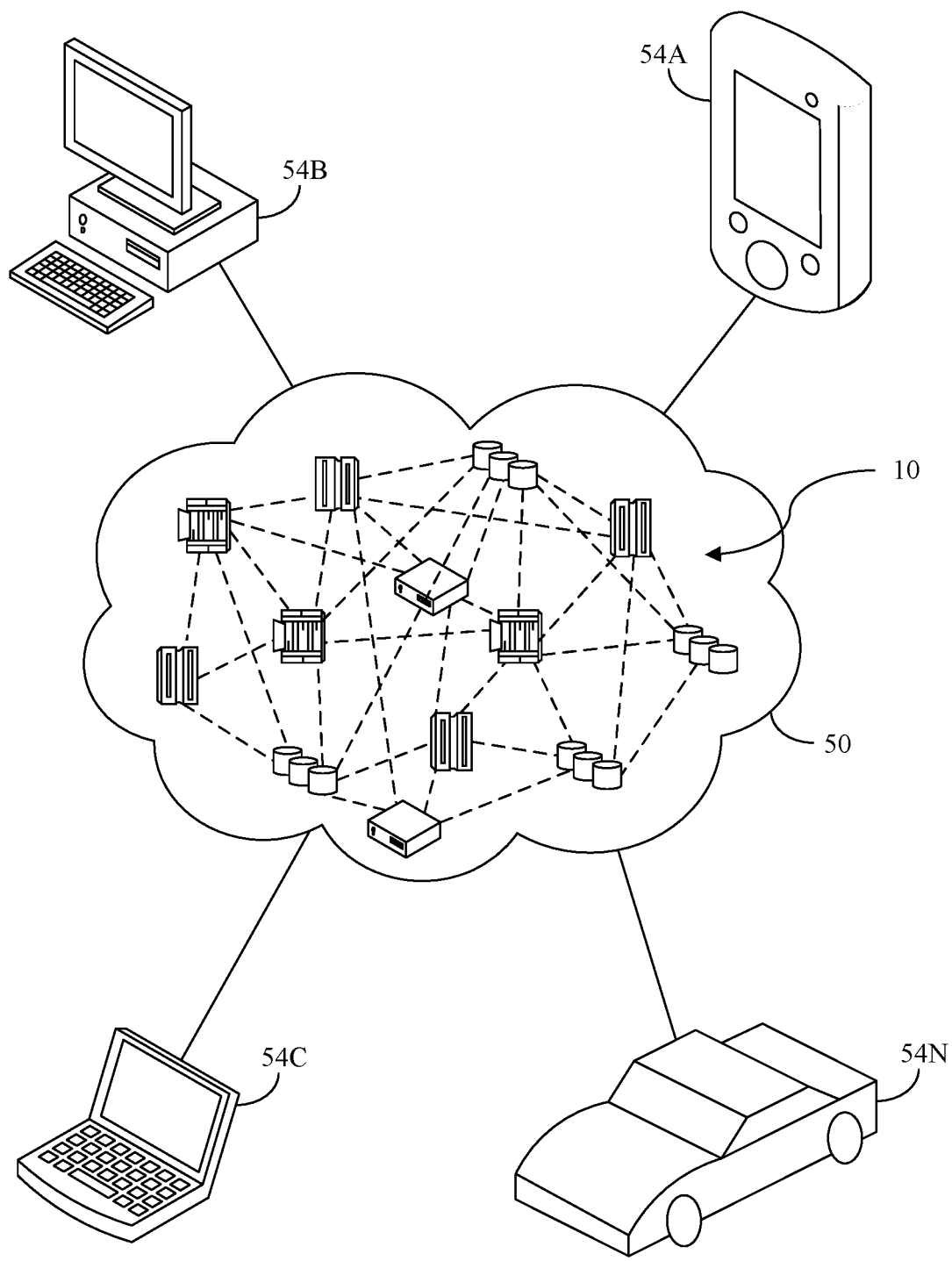
FIG. 1 depicts a cloud computing environment according to an embodiment of the present invention.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to data processing systems, and more particularly, to electronic systems for processing documents that are electronically generated and stored by a computer or similar device. Such systems, for example, can assist an organization in implementing a QMS and complying with various standards set forth by the QMS. The systems, for example, can assist the organization in maintaining and updating documents, such as periodic documentary submissions to regulatory authorities.

One aspect of QMS-related and various other types of document management is maintaining consistency among related documents generated at various times by various elements within an organization. This same need for document consistency also applies among separate organizations, as for example whenever two or more entities negotiate an agreement through an exchange of offer and counteroffers or when two or more parties document a transaction or series of transactions through an exchange of multiple documents.

The methods, systems, and computer program products disclosed herein change the functionality of data processing devices and document management systems with respect to related documents. In accordance with the inventive arrangements disclosed herein, changes in content among multiple documents (or equivalently, among revisions to an original version of a document) are identified automatically without human interaction. The changes identified are changes to substantive content and are identified apart from mere grammatical changes or changes in writing style. Based on the identified changes in substantive content, the probability of a document discrepancy is determined. Discrepancy mitigation procedures are automatically initiated in response to the determination of a probable discrepancy among two or more of the documents.

The methods, systems, and computer program products, as described herein, thus extend the functionality of data processing devices by enabling the automatic identification of substantive changes in document content and an assessment of potential discrepancies among related documents. Rather than utilizing processor resources to present multiple documents in a side-by-side juxtaposition for a user to assess whether and to what extent the documents disagree, the identification of possible discrepancies is automatically generated. The identification based on machine-identified differences among documents can be performed more rapidly and, potentially more thoroughly, than by an individual's side-by-side comparisons of separate documents. The enhanced functionality of the data processing device not only relieves the user of a burden, but moreover, enhances the performance of the data processing device itself by providing the device with additional functionalities that more efficiently and more quickly determine probable discrepancies among documents and functionalities that are capable of automatically responding to identified document discrepancies.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

It is understood in advance that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
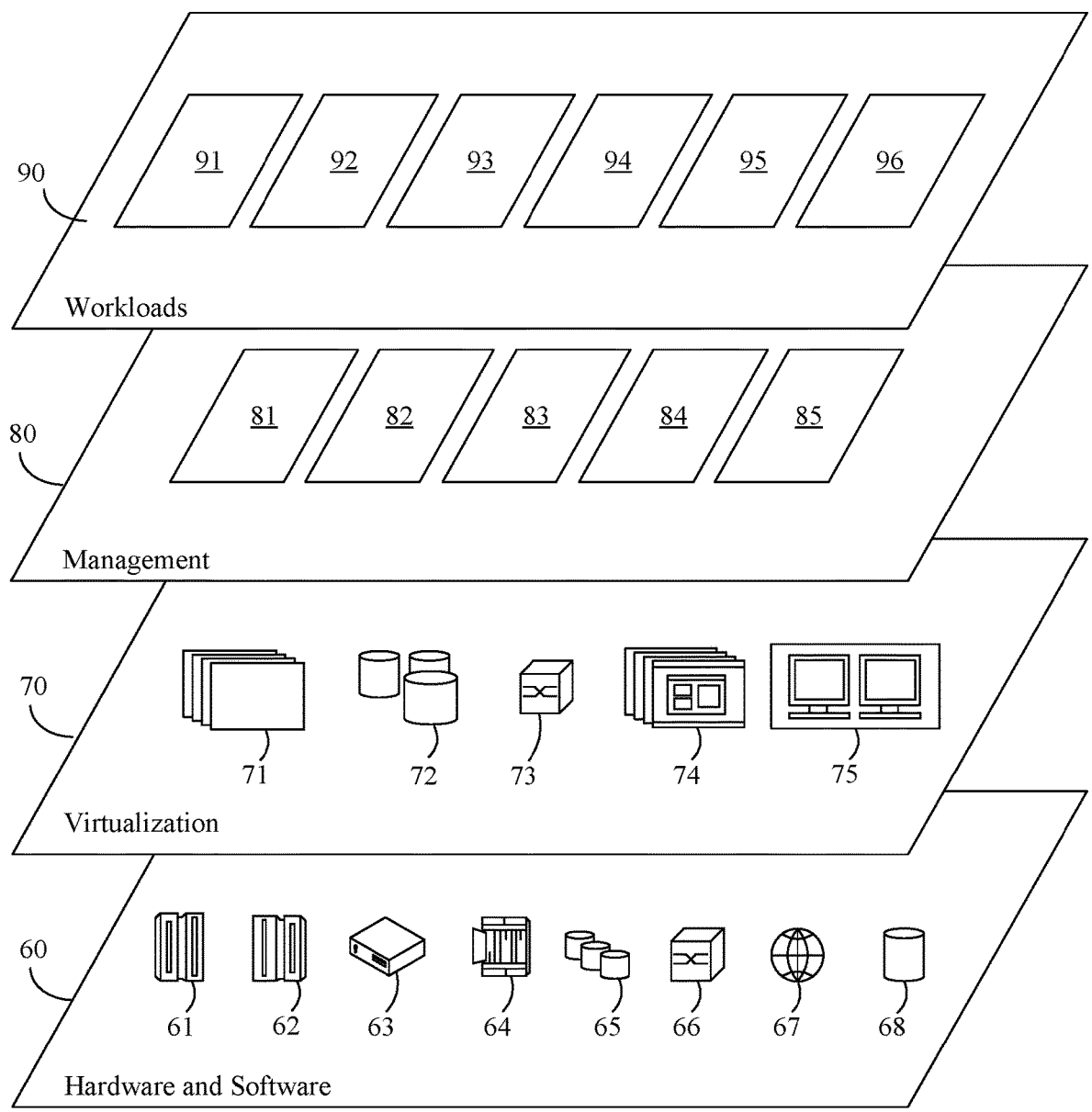
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document discrepancy determination and mitigation 96.

In one or more embodiments, a system of document discrepancy determination and mitigation 96 is capable of identifying a discrepancy probability with respect to multiple documents that share a dependency. As defined herein, "dependency" means that two or more documents are related to each other based on topic or subject matter. For example, successive document revisions (each revision designated as a separate document) share a dependency with the original version and with each other. Documents that are periodically filed with a regulatory body and that relate to common subject matter, for example, share a dependency. More generally, documents that describe or relate to a common object, event, transaction, objective, or relationship share a dependency. As defined herein, "discrepancy" means a substantive change in content or meaning of two or more documents that share a dependency. Thus, for example, mere grammatical changes (e.g., verb conjugation, adjective or adverb declension) or changes in writing style among dependent documents are not discrepancies. As defined herein, "discrepancy probability" is a qualitative likelihood or a quantitative probability (from zero to one) that a change in word patterns (e.g., paragraph, sentence, word) from one document to another results in a change in the substantive content or meaning of the topic or subject matter of the documents.

The system of document discrepancy determination and mitigation 96 can fragment two or more documents into corresponding portions and mark each fragment. The system can identify a discrepancy probability by comparing the markings. A discrepancy measure can be determined based on the markings. As defined herein, "discrepancy measure" is a value corresponding to a discrepancy probability. For example, in one embodiment described below, a discrepancy measure is calculated based on the number identified discrepancies between two documents.

The system of document discrepancy determination and mitigation 96 can generate encodings (e.g., codes, checksums, hash values, or other numerical values) that uniquely correspond to specific word patterns to mark the fragments. A discrepancy between corresponding fragments in separate documents occurs if a word pattern in a fragment of one document is not identically present in the corresponding fragment of the other document. Because each encoding is unique to a specific word pattern, the system discerns the discrepancy based solely on the non-matching marks (encodings) of each fragment. The system's ability to mark multi-word fragments (e.g., sentence or paragraph) using unique encodings enables the system to determine a discrepancy between a pair of documents based only on a comparison of two values—the respective encodings that mark the fragments—rather than a comparison of the individual words of each of the fragments. The system thus can make the determination more rapidly than a system making conventional word-by-word comparisons can. In such cases, the determination of encodings on the fragment level and subsequent comparison thereof may be performed in a more computationally efficient manner and may be performed in less runtime.

The system of document discrepancy determination and mitigation 96 can initiate one or more discrepancy mitigation procedures in response to a predefined discrepancy measure exceeding a predetermined threshold. The system can be used, for example, in conjunction with a document management system, blockchain, natural language processing system, or other system. Further features of a system for document discrepancy determination and mitigation 96 are described below in greater detail.

Figure 3:
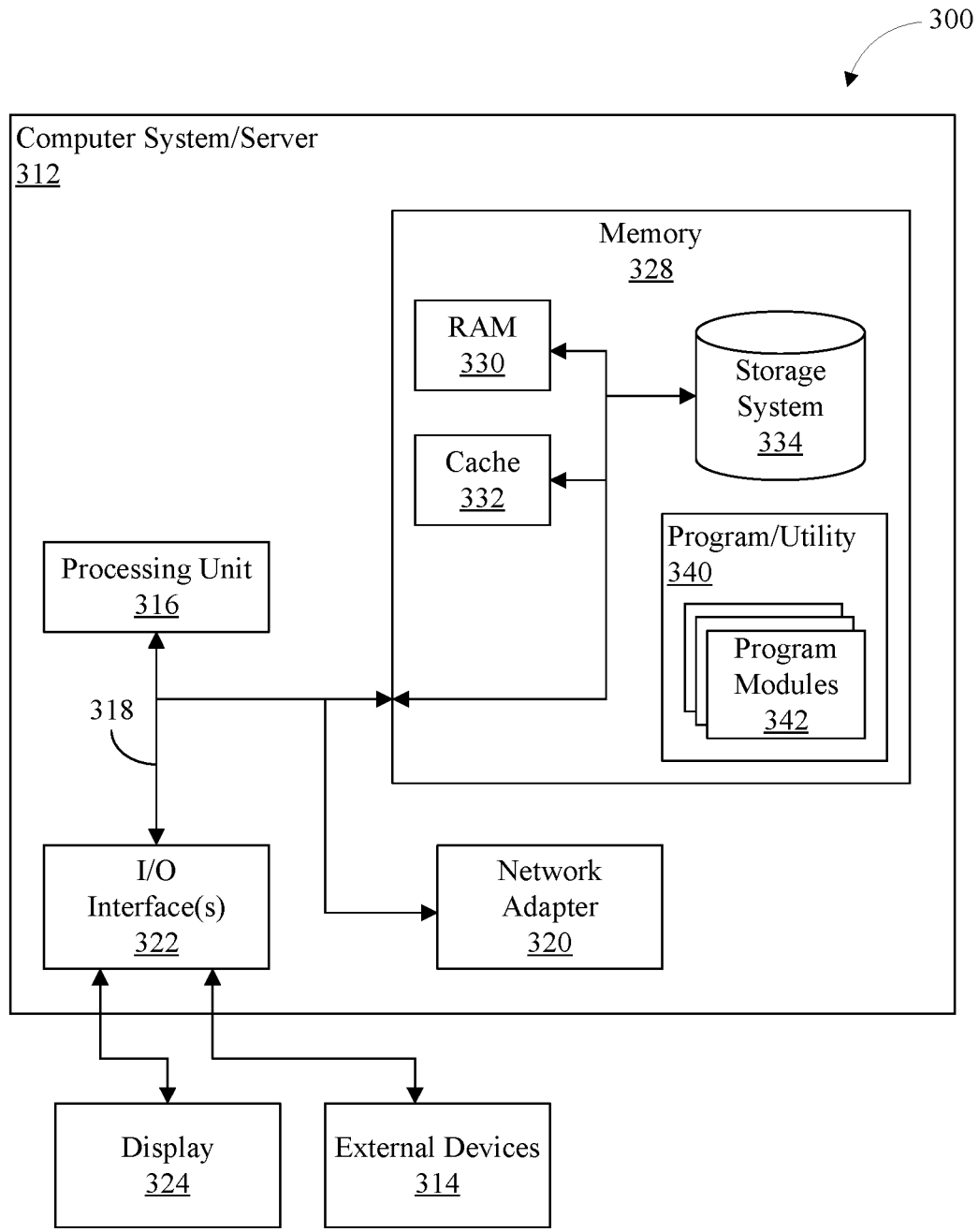
FIG. 3 depicts a cloud computing node according to an embodiment of the present invention.

FIG. 3 illustrates a schematic of an example of a computing node 300. In one or more embodiments, computing node 300 is an example of a suitable cloud computing node. Computing node 300 is not intended to suggest any limitation as to the scope of use or functionality of embodiments of the invention described herein. Computing node 300 is capable of performing any of the functionality described within this disclosure.

Computing node 300 includes a computer system 312, which is operational with numerous other general-purpose or special-purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system-executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device. The components of computer system 312 may include, but are not limited to, one or more processors 316, a memory 328, and a bus 318 that couples various system components including memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system readable media. Such media may be any available media that is accessible by computer system 312, and may include both volatile and non-volatile media, removable and non-removable media.

Memory 328 may include computer system readable media in the form of volatile memory, such as random-access memory (RAM) 330 and/or cache memory 332. Computer system 312 may further include other removable/non-removable, volatile/non-volatile computer system storage media. By way of example, storage system 334 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules may include system for document discrepancy determination and mitigation 96 or portions thereof.

Program/utility 340 is executable by processor 316. Program/utility 340 and any data items used, generated, and/or operated upon by computer system 312 are functional data structures that impart functionality when employed by computer system 312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via input/output (I/O) interfaces 322. Computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It should be understood that although not shown, other hardware and/or software components could be used in conjunction with computer system 312. Examples, include, but are not limited to: microcode, device drivers, redundant processing units, external disk drive arrays, RAID systems, tape drives, and data archival storage systems, etc.

While computing node 300 is used to illustrate an example of a cloud computing node, it should be appreciated that a computer system using an architecture the same as or similar to that described in connection with FIG. 3 may be used in a non-cloud computing implementation to perform the various operations described herein. In this regard, the example embodiments described herein are not intended to be limited to a cloud computing environment. Computing node 300 is an example of a data processing system. As defined herein, the term "data processing system" means one or more hardware systems configured to process data, each hardware system including at least one processor programmed to initiate operations and memory.

Computing node 300 is an example of computer hardware. Computing node 300 may include fewer components than shown or additional components not illustrated in FIG. 3 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 300 is also an example of a server. As defined herein, the term "server" means a data processing system configured to share services with one or more other data processing systems. As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. In one or more embodiments, the various user devices described herein may be client devices. Network infrastructure, such as routers, firewalls, switches, access points and the like, are not client devices as the term "client device" is defined herein.

Figure 4:
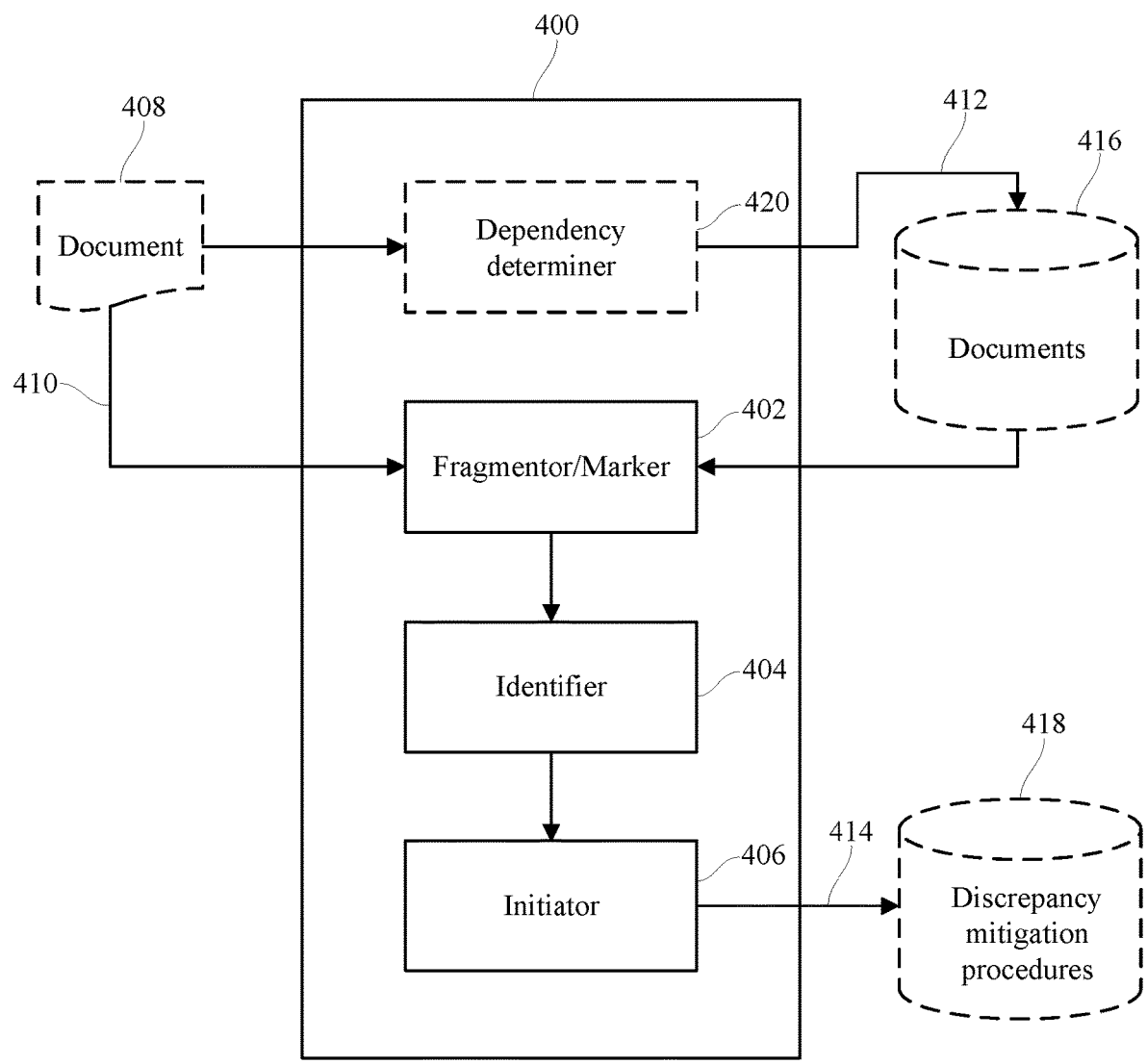
FIG. 4 depicts a system for document discrepancy determination and mitigation according to an embodiment of the present invention.

FIG. 4 depicts system 400, which according to one embodiment, is similar to the system for document discrepancy determination and mitigation 96 described in reference to FIG. 2. System 400 illustratively includes fragmentor/marker 402, identifier 404, and initiator 406. In one embodiment, system 400 is implemented in computer system-executable instructions (e.g., one or more program modules) that are executable by a processor such as processor 316 of computer system 312 described in reference to FIG. 3. Accordingly, system 400 can be implemented, for example, in a server (e.g., cloud-based server) or other type of computer system. In other embodiments, one or more of fragmentor/marker 402, identifier 404, and initiator 406 can be implemented in hardwired circuitry or in a combination of circuitry and computer system-executable instructions.

System 400 can receive documents, illustrated by document 408, from an external source (not shown) via communications network 410 (e.g., local area network, wide area network, Internet). Communications network 410, for example, can communicatively couple various sources of documents to the computer system (e.g., server) that executes the computer system-executable instructions, which according to one embodiment implement system 400. The same computer system optionally can communicatively couple via the same or different communication networks 412, 414 to document database 416 and discrepancy mitigation procedures database 418, respectively. Discrepancy mitigation procedures database 418 electronically stores one or more sets of computer system-executable instructions that, as described more fully below, cause a computer system to execute one or more discrepancy mitigation procedures in response to a system-determined document discrepancy.

Figure 5:
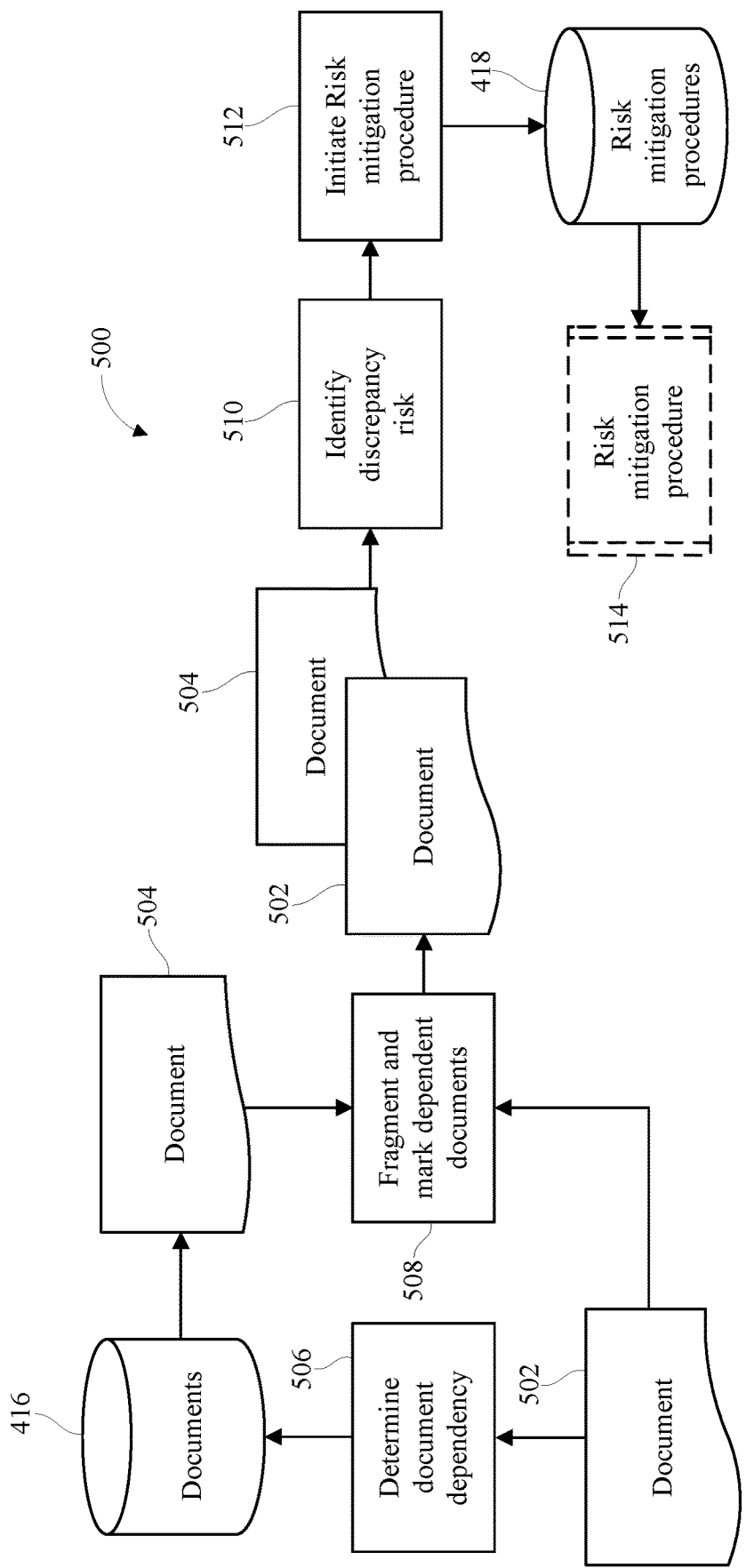
FIG. 5 depicts certain operative features of a system for document discrepancy determination and mitigation according to an embodiment of the present invention.

Referring additionally to FIG. 5, certain operative features 500 of system 400 are depicted. The operative features are illustrated with respect to two representative documents, document 502 and document 504, but the operative features can be applied with respect to more than two documents. Document 502 is initially presented to system 400. Document 502 can be submitted by a user or retrieved by system 400 automatically via communications network 410. In one embodiment, system 400 can be integrated in a data processing system, such as a document management system, that automates a document-approval workflow process. Document 502 can be recognized by system 400 as an approval-pending document when the document is posted as a draft to the document management system. Document 502, in other embodiments, can be presented to system 400 via other mechanisms and for purposes other than document approval.

Document 502 can share a dependency with one or more other documents that are stored electronically in document database 416. For example, document 502 can be a revision of document 504, which illustratively is stored in document database 416. Document 504, in another example, can be a template or model document with which document 502 must conform in some respect. In still another example, document 502 and document 504 can be two of a series of changing versions of an underlying original-version document. Such a series of documents, for example, can be part of an exchange of documents during a negotiation in which different parties alternately submit written proposals and counterproposals. Document 502 and document 504 can be separate copies of a written agreement for the exchange of goods or services that result from such a negotiation. In yet another example, document 502 and document 504 can be part of a series of revisions of a manual documenting a procedure that is modified over time. Document 502 and document 504 can be part of a series of documents submitted intermittently, for example, to a regulatory authority.

System 400 optionally can include dependency determiner 420, which in various embodiments described below, can make an initial, automatic determination as to which electronically stored documents share a dependency with document 502. Documents that share a dependency can be electronically stored in separate databases, each of which is communicatively coupled to a computer system (e.g., server) that implements system 400. As also described below, dependency determiner 420 can determine which specific portions, or fragments, of two or more documents that share a dependency with one another.

Operatively, a shared dependency between newly presented document 502 and document 504 (electronically stored in documents database 416) is determined at block 506 in FIG. 5. In response, fragmentor/marker 402 generates one or more fragments for each document and marks each fragment at block 508. If corresponding fragments of two documents that share a dependency have different markings, the different markings indicate points of departure between the documents. For example, if document 502 is a newly presented version of document 504 (e.g., a revision of an original or earlier revision of a document), different markings can indicate which fragments are changed in the separate versions and/or which fragments are newly introduced into or omitted from document 502, the latter-prepared document. As defined herein, "point of departure" is a word pattern difference between fragments of two or more documents that relate to a common topic or common subject matter. "Word pattern," as defined herein, is a section, paragraph, sentence, word, of a document or the entire document. (System 400, as described below, operatively adjusts to any level of granularity for marking documents based on a particular mode of analysis.)

In different embodiments, fragmentor/marker 402 can implement one or more various marking techniques. Various encoding techniques can be used to mark fragments by converting the specific word patterns comprising each fragment (e.g., section, paragraph, sentence, word, or other word pattern) into a code value (an "encoding") uniquely corresponding to the specific word pattern. Fragmentor/marker 402, in one embodiment, uses a checksum function as an encoding technique to generate checksums based on data input in the form of word patterns or keywords. The checksum function can generate a unique encoding (checksum) for marking each sequence of words. The sequence can comprise the entire document, sections of the document, paragraphs, sentences, or phrases, depending on the operative level of granularity of fragmentor/marker 402 (described more fully below). Fragmentor/marker 402 in certain instances can mark fragments by assigning a checksum to a single word, designated as a keyword. Different checksum functions can be implemented by fragmentor/marker 402 for generating checksums used to mark fragments. Accordingly, at block 508 in FIG. 5, fragmentor/marker 402 can generate one or more checksums and can mark one or more fragments of document 502 as well as one or more corresponding fragments of document 504 using the one or more checksums generated.

In another embodiment, fragmentor/marker 402 uses a hash function as the encoding technique by generating hash values based on data input in the form of word patterns or keywords. The hash function can generate unique encodings (hash values) for marking one or more fragments of document 502 and one or more corresponding fragments of document 504. One aspect of both checksum and hash functions is the generation of significantly different encodings or numerical values for even slight changes in input data. Accordingly, even a slight change in a word pattern between one document fragment and a corresponding fragment causes fragmentor/marker 402 to mark the corresponding fragments differently. If an encoding (e.g., checksum or hash value) that marks a document fragment of document 502 identically matches the encoding of a mark of a corresponding fragment of document 504, then the same word pattern or word is identically present in both documents. If an encoding (e.g., checksum or hash value) that marks a fragment of one document is not identically matched by the same encoding (e.g., checksum or hash value) marking a corresponding fragment of another document, however, there is a discrepancy between the two documents. That is, a word pattern or word in one document is not identically present in the other document. Using an algorithm such as sha256sum, for example, fragmentor/marker 402 can mark different word patterns or keywords with numerical values (encodings) that are highly unlikely to be equal even if the word patterns or keywords are only slightly different.

Fragmentor/marker 402 can generate markings (e.g., checksums, hash values) independently of grammatical structures (e.g., verb conjugation, adjective or adverb declension) and stylistic differences in writing between dependent documents. In one embodiment, fragmentor/marker 402 analyzes the content of documents such as document 502 and 504 using a lemmatizer, a natural language processing (NLP) technique that performs morphological analysis to identify the lemmas of distinct words of text. A lemma is the base or dictionary form of a word. For example, implementing a lemmatization, fragmentor/marker 402 treats a word such as "saw" as either "see" or "saw" depending on whether the word is used in the document as a verb or a noun, which can be determined by NLP parts-of-speech tagging.

In another embodiment, fragmentor/marker 402 can generate markings (e.g., checksums, hash values) independently of grammatical structures (e.g., verb conjugation, adjective or adverb declension) and stylistic differences in documents using a stemming procedure to reduce inflectional forms and derivationally related forms of words in the documents. Stemming typically requires less information than a lemmatizer (which relies on a vocabulary and morphological analysis to lemmatize words), but is a less refined, heuristic process that identifies the roots of words by eliminating word endings or derivational affixes of the words. Fragmentor/marker 402, in various embodiments, can implement different stemming algorithms, such as the Porter stemmer (which consists of five, sequentially applied phases of word reductions), Lovin stemmer, or Paice stemmer.

Fragmentor/marker 402 can generate document fragments recursively ranging from an entire document, separate sections, paragraphs, and single sentences. A fragment comprising the entire document, a section, or a paragraph is a composite fragment, whereas a sentence or word is a basic fragment. Basic fragments can also include disclaimers, footnotes, endnotes, tables of contents, references, bibliographies, footers, and headers. Fragmentor/marker 402 can fragment a document into separate portions by recognizing page length, page breaks, text sizes, and stylistic features. Fragmentor/marker 402 can recognize parents, siblings, and children of individual fragments. Fragmentor/marker 402 can ignore formatting, comments, and metadata. The level of granularity of the fragmenting can vary depending on the nature of the documents, as well as the type of dependency among multiple documents under analysis by system 400. For example, if documents 502 and 504 represent separate copies of an underlying document, each in entirety is a corresponding fragment because any difference (even a single word change) is a discrepancy. In other instances, only certain sections need be considered, and accordingly, only designated sections are fragmented and marked by fragmentor/marker 402. In some situations, an individual word can assume the role of a keyword and be marked accordingly. For example, in the context of a negotiation involving contract terms, fragmentor/marker 402 can mark "acceptable" differently than "unacceptable" to highlight a critical distinction between two or more documents comprising separate copies of an underlying contract. In other situations, only certain designated sections or individual paragraphs need be fragmented and marked. For example, a periodic submission to a regulatory agency may incorporate one or more portions of prior submissions (which, of course, must be entirely consistent) revising only certain select portions for a current submission. The level of granularity (ranging from keywords or key sentences to an entire document) can thus vary depending on the circumstances that dictate the portions and degree of consistency required among the specific documents. In every instance, if an encoding value (e.g., checksum or hash value or other numerical value) that marks a document fragment of document 502 matches a mark of a corresponding fragment of document 504, then the same word pattern or word is identically present in both documents.

Dependency determiner 420 can determine a shared document dependency between two or more electronically stored documents based on identified topics or subject matter of the documents. For example, an enterprise may maintain one set of documents related to products that must be submitted periodically to one regulatory body and another set of financial documents that must be submitted to a different regulatory body. A shared dependency can exist among the first set of documents, but the dependency is different than that shared among the second set of documents. Likewise, there may be different dependencies shared among different sets of documents related to different customers or clients of the enterprise. Even within the enterprise, within-group document dependencies may differ for different projects pursued by different work groups within the enterprise. In each instance, an initial task for mitigating a possible or probable discrepancy is to group documents according to the documents' shared dependency. One mechanism for doing so is by grouping documents based on the documents' topic or subject matter. Dependency determiner 420 can identify dependencies among documents and explicitly specify documents that share a dependency.

Figure 6:
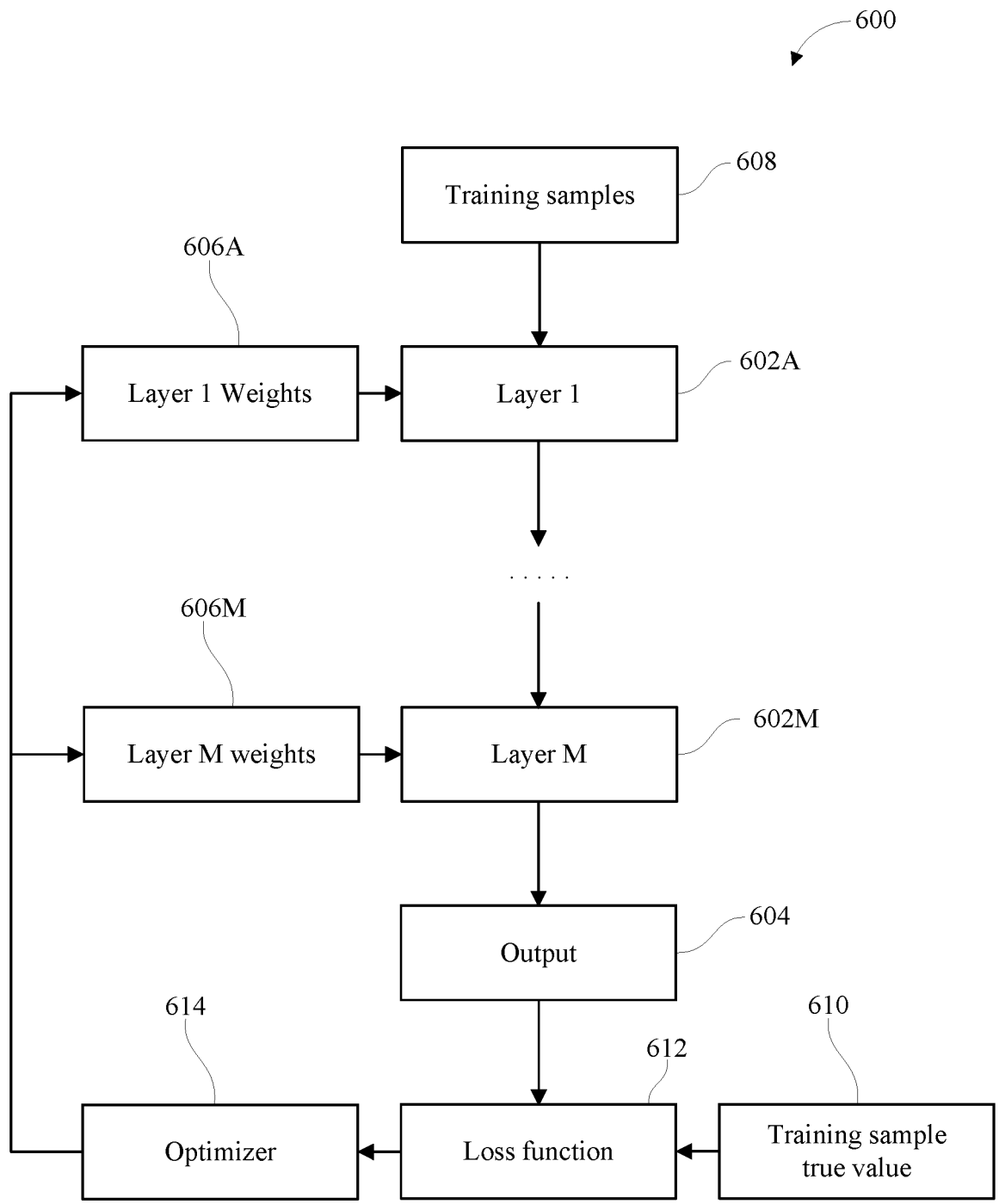
FIG. 6 depicts a representative deep learning neural network used in a system for document discrepancy determination and mitigation according to an embodiment of the present invention.

Referring additionally to FIG. 6, in one embodiment, dependency determiner 420 uses neural network 600 to classify documents into one of N categories, each category corresponding to a predetermined topic or subject matter class. Neural network 600 is illustratively a deep learning neural network and comprises a directed, acyclic graph of layers (data processing modules or filters) 602A through 602M that are sequentially chained together. The output 604 generated by neural network 600 is based on input data that feeds through each layer, each layer modifying the output of a preceding layer based on a set of parameters or weights 606A through 606M. The weights (or kernel and bias attributes) are trained (iteratively refined) using training data comprising multiple training samples 608 that are fed into the neural network. The output generated is compared with true values 610 of the training samples 608. The difference between the generated values and true values 610 is measured by a loss calculated by loss function 612. In one embodiment, loss function 612 of dependency determiner 420 is the categorical cross-entropy criterion. In a feedback fashion, optimizer 614 adjusts weights 606A through 606M over successive iterations using the backpropagation algorithm. The backpropagation algorithm adjusts weights 606A through 606M, with each successive adjustment, in a direction that lowers the loss calculated by loss function 612. The iterative refinement of weights 606A through 606M continues until an acceptable level of accuracy is achieved in classifying a separate set of test data.

Input to dependency determiner 420 is initially text data and is therefore transformed into numerical tensors (multi-dimensional algebraic objects analogous to one-dimensional vectors) by breaking the text (e.g., words, characters, n-grams) into tokens and associating numeric vectors with each. Dependency determiner 420 can use any technique such as categorical encoding (one-hot encoding) or word embedding to transform text into numerical tensors. For each document so transformed, the neural network of dependency determiner 420 outputs an N-tuple, each of whose elements is the probability (between zero and one) that the document belongs to the corresponding one of the N categories. The document is classified as belonging to the category for which the probability is greatest. Responsive to classifying a newly presented document, the fragmentor/marker 402 fragments and marks each of the documents belonging to the same class to which the newly presented document belongs, as determined by dependency determiner 420.

Referring still to FIGS. 4 and 5, identifier 404 at block 510 can identify a discrepancy between document 502 and document 504 by comparing the markings of fragments of document 502 and corresponding fragments of document 504. A probability of discrepancy arises due to changing word patterns in document 502 that change from the form in which corresponding word patterns appear (or do not appear) in document 504. If one or more new word patterns are introduced into document 502—word patterns that do not appear in the document 504—then the markings of each of the one or more new word patterns in document 502 is not matched by a corresponding marking in document 504. Conversely, any word pattern present in document 504 that is not also present in document 502 results in a non-matching marking. Thus, the greater the number of word patterns from document 504 that are not also in document 502, the greater the discrepancy probability. Accordingly, one discrepancy measure is the number of non-matching markings with respect to two documents. If the number of markings that do not match is zero, then identifier 404 identifies a zero probability of discrepancy based on a discrepancy measure of calculated based on the number of non-matching markings with respect to the documents. (No fragments are different between document 502 and document 504.) Conversely, if none of the markings of the corresponding fragments match, then the discrepancy measure (commensurate with the number non-matching marks) is greater than zero and identifier 404 identifies a non-zero probability of discrepancy. Accordingly, the greater the number of new word patterns introduced into a newly presented document or the greater the number of word patterns not included in the newly presented document from a dependent document, the greater the number of unmatched markings between the documents and, commensurately, the greater is the discrepancy measure. The greater the discrepancy measure, the greater the discrepancy probability.

In some instances, a relatively low discrepancy measure may indicate that deviations among the documents are limited and thus do not give rise to a discrepancy probability that warrants concern over any inconsistency among the documents. If, however, the number exceeds a predetermined threshold, then the discrepancy probability is correspondingly higher. Accordingly, as described in one embodiment, a probability measure is the number of markings of document 502 that do not match markings of document 504. If the number exceeds the predetermined threshold, then identifier 404 identifies a probable or likely document discrepancy.

Initiator 406 initiates one or more discrepancy mitigation procedures at block 512 in response to a probable document discrepancy. Illustratively, discrepancy mitigation procedure 514, which comprises a set of computer system-executable instructions electronically stored in discrepancy mitigation procedures database 418, is initiated at block 512 by initiator 406 in response to a discrepancy measure exceeding a predetermined threshold.

In one embodiment, system 400 can include an alert function that is executed responsive to a discrepancy probability identified by identifier 404 based on discrepancy measure with respect to a newly presented document and an earlier-prepared document. The alert function can alert a system user to a probable document discrepancy when the user electronically posts the document to a document processing system operatively coupled with system 400. The alert (e.g., system-generated message) optionally can identify one or more documents that share a dependency with the document presented by the user. Optionally, the alert can also indicate points of departure (occurrences of substantive differences within documents) indicated by the fragments marked by fragmentor/marker 402 in the respective documents. For example, a point of departure can be identified in a fragment of the newly presented document that is marked with a uniquely assigned encoding (e.g., checksum or hash value or other numerical value) that is not matched by an encoding in the one or more documents determined to share a dependency with the newly presented document.

In another embodiment, system 400 can include an estimator function that estimates the cost (e.g., time utilization, monetary expenditure) of conforming a newly presented document to one or more other documents with which the newly presented document shares a dependency. The estimate can be based on factors such as the number of documents that contain fragments whose markings are not matched by the one or more other documents determined to share a dependency. Other factors can include historical costs associated with revising similar documents (e.g., identified with the neural network based on topic or subject matter) and the potential number of revisions based on the number of document fragments having non-matching markings. The potential number of revisions can be based on the number of upstream documents (earlier-prepared documents) and/or downstream documents (subsequent approvals or revisions expected to be necessitated by submission of the newly presented document). For example, an internal memorandum within an organization may have already gone through a number of revisions (each revision counting as a separate document), and yet may require even more after the latest revision (the newly presented document) is put forward for approval. In some instances, an author of a document that has gone and/or will go through successive revisions may decide that the current revision is not important enough to incur the estimated cost. Thus, the cost estimate generated by the estimator function can be conveyed to the user along with an option to withdraw or change the document (assuming the change eliminates the document discrepancy) before submitting the document (revision) to a document management system operatively coupled with system 400.

In yet another embodiment, system 400 can additionally or alternatively include a timing function. The timing function can calculate a deadline or timeframe for completing an approval process for a newly presented document. The timing function can be used in conjunction with a document management system with which system 400 is operatively coupled. The timing function can be initiated in response to the document first being presented by a user to the document management system. At each stage in the approval process, identifier 404 identifies a discrepancy probability based on a discrepancy measure for each new iteration (counted as a distinct document) and alerts the user of the time remaining to complete the approval process. A user may decide that, given a discrepancy probability identified by identifier 404 based on a discrepancy measure, a newly presented document (revision) does not warrant a likelihood of delaying final approval beyond the deadline. Accordingly, as with the cost estimate, the remaining time for completing an approval within the designated timeframe can be provided to the user along with an option to withdraw or change the document before submitting the document to the document approval process.

In still other embodiments, discrepancy mitigation procedures initiated by system 400 can include a workflow approval process, the annotating of one or more portions of a newly presented document, and/or generating a design-change document to record and detail revisions (counted as distinct documents) of a newly presented document. Each procedure individually or a combination of two or more of the procedures can be initiated by initiator 406 in response to identifier 404 identifying a discrepancy probability based on discrepancy measure.

Figure 7:
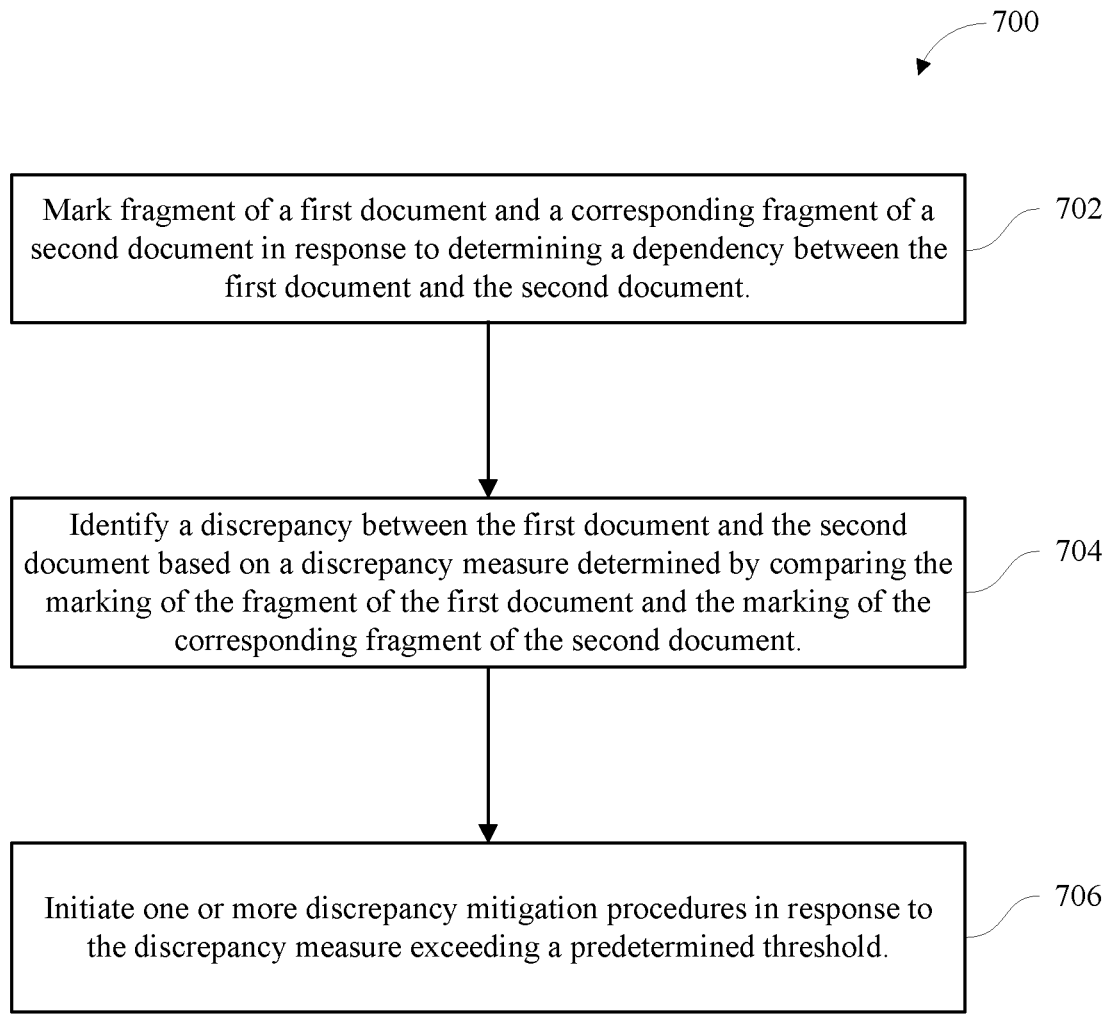
FIG. 7 is a flowchart of a method of document discrepancy determination and mitigation according to an embodiment of the present invention.

FIG. 7 is a flowchart of method 700 for detecting and mitigating document discrepancy probabilities, according to one embodiment. Method 700 can be performed by a system the same as or similar to the systems described in reference to FIGS. 1-6. The system at block 702 can mark one or more fragments of a first document and one or more corresponding fragments of a second document in response to determining a dependency between the first document and the second document. The system at block 704 can identify a discrepancy probability between the second document and the first document based on a discrepancy measure that is determined by comparing the marking(s) of the fragment(s) of the first document and the marking(s) of the corresponding fragment(s) of the second document. The system at block 706 can initiate one or more discrepancy mitigation procedures in response to the discrepancy measure exceeding a predetermined threshold.

Depending on the content of the documents, the system can fragment the first document into multiple first document fragments and can fragment the second document into multiple second document fragments, each of the second document fragments corresponding to one of the first document fragments. The system can mark each of the first document fragments and each of the second document fragments. The system can determine the number of markings of the first document fragments that do not match markings of the corresponding second document fragments and identify the discrepancy probability based on a probability measure calculated as the number of markings of the first document fragments that do not match markings of the corresponding second document fragments.

The system can calculate encodings for marking the one or more fragments of the first document and corresponding one or more fragments of the second document. Each calculated encoding, in one embodiment, can be a checksum. In another embodiment, each calculated encoding can be a hash value. The system can identify a discrepancy probability based on a discrepancy measure by determining that a first encoding that marks a fragment of the first document does not match a second encoding that marks a corresponding fragment of the second document.

The system can fragment and mark corresponding fragments of the first document and the second document in response to automatically determining a dependency between the first document and the second document. In one embodiment, dependency can be determined based on a classification of the first document and the second document. The classification can be based on the topic or subject matter of both the first and second document. The classification can be made with a classification model trained using machine learning, such as a deep learning neural network.

In one embodiment, the system can alert a system user to a discrepancy probability identified based on a discrepancy measure with respect to the first and second document. The system can generate a message that identifies the documents as sharing a dependency. Optionally, the alert can indicate points of departure, or occurrences of substantive differences within documents, which are indicated by the fragments marked in the first and second documents.

In another embodiment, the system can estimate the cost of conforming the first document to the second document. The estimate can be based on factors such as the number of markings of fragments of the first document and second document that do not match. Other factors can include historical costs associated with revising multiple documents that are identified as being similar to one another. Similarity can be determined by classifying documents using a neural network trained to classify a document according to the topic or subject matter of the document's content.

In yet another embodiment, the system can calculate a deadline or timeframe for completing an approval process for approving the first document in response to determining a discrepancy probability based on a probability measure with respect to the first document and the second document. In still another embodiment, the system can initiate a workflow approval process in response to identifying a discrepancy probability based on a discrepancy measure with respect to the first document and the second document. The system can initiate the annotating of portions of the first or the second document. The system can initiate revisions to portions of one or both the first and the second document. In various other embodiments, the system can respond to a discrepancy measure exceeding a predetermined threshold by initiating any combination of two or more of the workflow approval process, the annotating of one or more portions of the first and/or second document, and/or revising the first and/or second document The terminology used herein is for the purpose of describing particular embodiments only and is not intended to be limiting. Notwithstanding, several definitions that apply throughout this document now will be presented.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human interaction or intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the terms "if," "when," and "upon" mean "in response to" or "responsive to," depending upon the context. Thus, for example, the phrase "if [a stated condition or event] is detected" is to be construed to mean "in response to detecting [the stated condition or event]" or "responsive to detecting [the stated condition or event]," depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the phrase "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the term "user" means a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented solely for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving, by a document management system and from a user, a second document;
   initiating, by the document management system, a timing function in response to the second document being received;
   automatically identifying, in response to the second document being received, a first document based upon an automated determination that a dependency exists between the first document and the second document;
marking, using computer hardware, a fragment of a first document and a corresponding fragment of a second document;
identifying, using the computer hardware, a discrepancy probability with respect to the first document and the second document based on a discrepancy measure determined by comparing the marking of the fragment of the first document and the marking of the corresponding fragment of the second document;
determining that a discrepancy exists between the first document and the second document based upon the discrepancy probability;
estimating a cost of revising the second document to eliminate the discrepancy between the first document and the second document; and
initiating, using the computer hardware, a discrepancy mitigation procedure in response to the discrepancy measure exceeding a predetermined threshold, wherein
the discrepancy mitigation procedure includes providing, via a client interface operably connected to the document management system and to the user, the cost and a remaining time provided by the timing function and a selectable option to: (i) withdraw the second document from an approval process, or (ii) modify the second document,
the timing function determines the remaining time for completing the approval process for the second document,
the dependency is based upon the second document being a revision of the first document, and
the discrepancy is a substantive change in content or meaning between the first document and the second document.

2. The method of claim 1, wherein
the fragment of the first document comprises a plurality of first document fragments and the corresponding fragment of the second document comprises a plurality of corresponding second document fragments, each second document fragment corresponding to one of the first document fragments, wherein
the marking comprises marking each of the first document fragments and each of the second document fragments, and wherein the discrepancy measure is determined by:
   determining a number of markings of the first document fragments that do not match markings of the corresponding second document fragments; and
   determining the discrepancy measure based on the number of markings of the first document fragments that do not match markings of the corresponding second document fragments.

3. The method of claim 1, wherein
the marking comprises calculating a first encoding for the fragment of the first document and a second encoding for the corresponding fragment of the second document, and wherein the identifying based on the discrepancy measure comprises determining that the first encoding does not match the second encoding.

4. A system, comprising:
a processor configured to initiate operations including:
   receiving, by a document management system and from a user, a second document;
   initiating, by the document management system, a timing function in response to the second document being received;
   automatically identifying, in response to the second document being received, a first document based upon an automated determination that a dependency exists between the first document and the second document;
   marking a fragment of a first document and a corresponding fragment of a second document;
   identifying a discrepancy probability with respect to the first document and the second document based on a discrepancy measure determined by comparing the marking of the fragment of the first document and the marking of the corresponding fragment of the second document;
   determining that a discrepancy exists between the first document and the second document based upon the discrepancy probability;
   estimating a cost of revising the second document to eliminate the discrepancy between the first document and the second document; and
   initiating, using the computer hardware, a discrepancy mitigation procedure in response to the discrepancy measure exceeding a predetermined threshold, wherein
the discrepancy mitigation procedure includes providing, via a client interface operably connected to the document management system and to the user, the cost and a remaining time provided by the timing function and a selectable option to: (i) withdraw the second document from an approval process, or (ii) modify the second document,
the timing function determines the remaining time for completing the approval process for the second document,
the dependency is based upon the second document being a revision of the first document, and
the discrepancy is a substantive change in content or meaning between the first document and the second document.

5. The system of claim 4, wherein
the fragment of the first document comprises a plurality of first document fragments and the corresponding fragment of the second document comprises a plurality of corresponding second document fragments, each second document fragment corresponding to one of the first document fragments, wherein
the marking comprises marking each of the first document fragments and each of the second document fragments, and wherein the discrepancy measure is determined by:
determining a number of markings of the first document fragments that do not match markings of the corresponding second document fragments; and
determining the discrepancy measure based on the number of markings of the first document fragments that do not match markings of the corresponding second document fragments.

6. The system of claim 4, wherein
the marking comprises calculating a first encoding for the fragment of the first document and a second encoding for the corresponding fragment of the second document, and wherein the identifying based on the discrepancy measure comprises determining that the first encoding does not match the second encoding.

7. A computer program product, comprising:
a computer readable hardware storage device having program instructions embodied therewith, the program instructions, which when executed by a computer hardware system, causes the computer hardware system to perform:
- receiving, by a document management system and from a user, a second document;
- initiating, by the document management system, a timing function in response to the second document being received;
- automatically identifying, in response to the second document being received, a first document based upon an automated determination that a dependency exists between the first document and the second document;
- marking a fragment of a first document and a corresponding fragment of a second document;
- identifying a discrepancy probability with respect to the first document and the second document based on a discrepancy measure determined by comparing the marking of the fragment of the first document and the marking of the corresponding fragment of the second document;
- determining that a discrepancy exists between the first document and the second document based upon the discrepancy probability;
- estimating a cost of revising the second document to eliminate the discrepancy between the first document and the second document; and
- initiating, using the computer hardware, a discrepancy mitigation procedure in response to the discrepancy measure exceeding a predetermined threshold, wherein the discrepancy mitigation procedure includes providing, via a client interface operably connected to the document management system and to the user, the cost and a remaining time provided by the timing function and a selectable option to: (i) withdraw the second document from an approval process, or (ii) modify the second document, the timing function determines the remaining time for completing the approval process for the second document, the dependency is based upon the second document being a revision of the first document, and the discrepancy is a substantive change in content or meaning between the first document and the second document.

8. The computer program product of claim 7, wherein the fragment of the first document comprises a plurality of first document fragments and the corresponding fragment of the second document comprises a plurality of corresponding second document fragments, each second document fragment corresponding to one of the first document fragments, wherein the marking comprises marking each of the first document fragments and each of the second document fragments, and wherein the discrepancy measure is determined by:

determining a number of markings of the first document fragments that do not match markings of the corresponding second document fragments; and determining the discrepancy measure based on the number of markings of the first document fragments that do not match markings of the corresponding second document fragments.

9. The computer program product of claim 7, wherein the marking comprises calculating a first encoding for the fragment of the first document and a second encoding for the corresponding fragment of the second document, and wherein the identifying based on the discrepancy measure comprises determining that the first encoding does not match the second encoding.

\* \* \* \* \*